(12) United States Patent
Roe et al.

(10) Patent No.: US 7,588,233 B2
(45) Date of Patent: Sep. 15, 2009

(54) WINCH ASSEMBLY INCLUDING CLUTCH MECHANISM

(75) Inventors: Erik O. Roe, Portland, OR (US); Darren K. Johnson, Portland, OR (US); Bryon M. Borntrager, West Linn, OR (US)

(73) Assignee: Warn Industries, Inc., Milwaukie, OR (US)

( * ) Notice: Subject to any disclaimer, the term of this patent is extended or adjusted under 35 U.S.C. 154(b) by 55 days.

(21) Appl. No.: 11/943,043

(22) Filed: Nov. 20, 2007

(65) Prior Publication Data

US 2008/0116430 A1 May 22, 2008

Related U.S. Application Data

(60) Provisional application No. 60/866,525, filed on Nov. 20, 2006.

(51) Int. Cl.
*B66D 1/14* (2006.01)

(52) U.S. Cl. .................... 254/346; 254/344; 254/345

(58) Field of Classification Search ................ 254/342, 254/344, 345, 346, 355, 370
See application file for complete search history.

(56) References Cited

U.S. PATENT DOCUMENTS

| | | | |
|---|---|---|---|
| 3,986,588 A | 10/1976 | Kuzarov | |
| 4,004,780 A | 1/1977 | Kuzarov | |
| 4,033,552 A | 7/1977 | Kuzarov | |
| 4,123,040 A | 10/1978 | Kuzarov | |
| 4,461,460 A * | 7/1984 | Telford | 254/344 |
| 4,545,567 A | 10/1985 | Telford et al. | |
| 4,650,163 A | 3/1987 | Peterson | |
| 4,736,929 A | 4/1988 | McMorris | |
| 4,873,474 A | 10/1989 | Johnson | |
| 5,214,359 A | 5/1993 | Herndon et al. | |
| 5,261,646 A | 11/1993 | Telford | |
| 5,482,255 A | 1/1996 | Daschel et al. | |
| 5,522,582 A | 6/1996 | Dilks | |
| 5,648,887 A | 7/1997 | Herndon et al. | |
| RE36,216 E | 6/1999 | Telford | |
| 6,046,893 A | 4/2000 | Heravi | |
| 6,604,731 B2 | 8/2003 | Hodge | |

* cited by examiner

*Primary Examiner*—Emmanuel M Marcelo
(74) *Attorney, Agent, or Firm*—Harness, Dickey & Pierce, P.L.C.

(57) ABSTRACT

A winch assembly includes a housing member, a drum rotatably coupled to the housing member, a drive shaft extending through the drum and into the housing member, a gear train located within the housing member and driven by the shaft, a coupling member axially fixed to the shaft, and a clutch assembly including a clutch knob. The shaft is fixed for rotation with and axially displaceable relative to a drive input. The clutch knob is rotatably coupled to the housing member and includes an axially extending ramped surface that axially displaces the shaft in first and second axial directions upon rotation of the clutch knob in first and second rotary directions. Rotation in the first rotary direction rotationally couples the drum to the gear train through engagement with the coupling member and rotation in the second rotary direction disengages the drum from rotational engagement with the gear train.

23 Claims, 9 Drawing Sheets

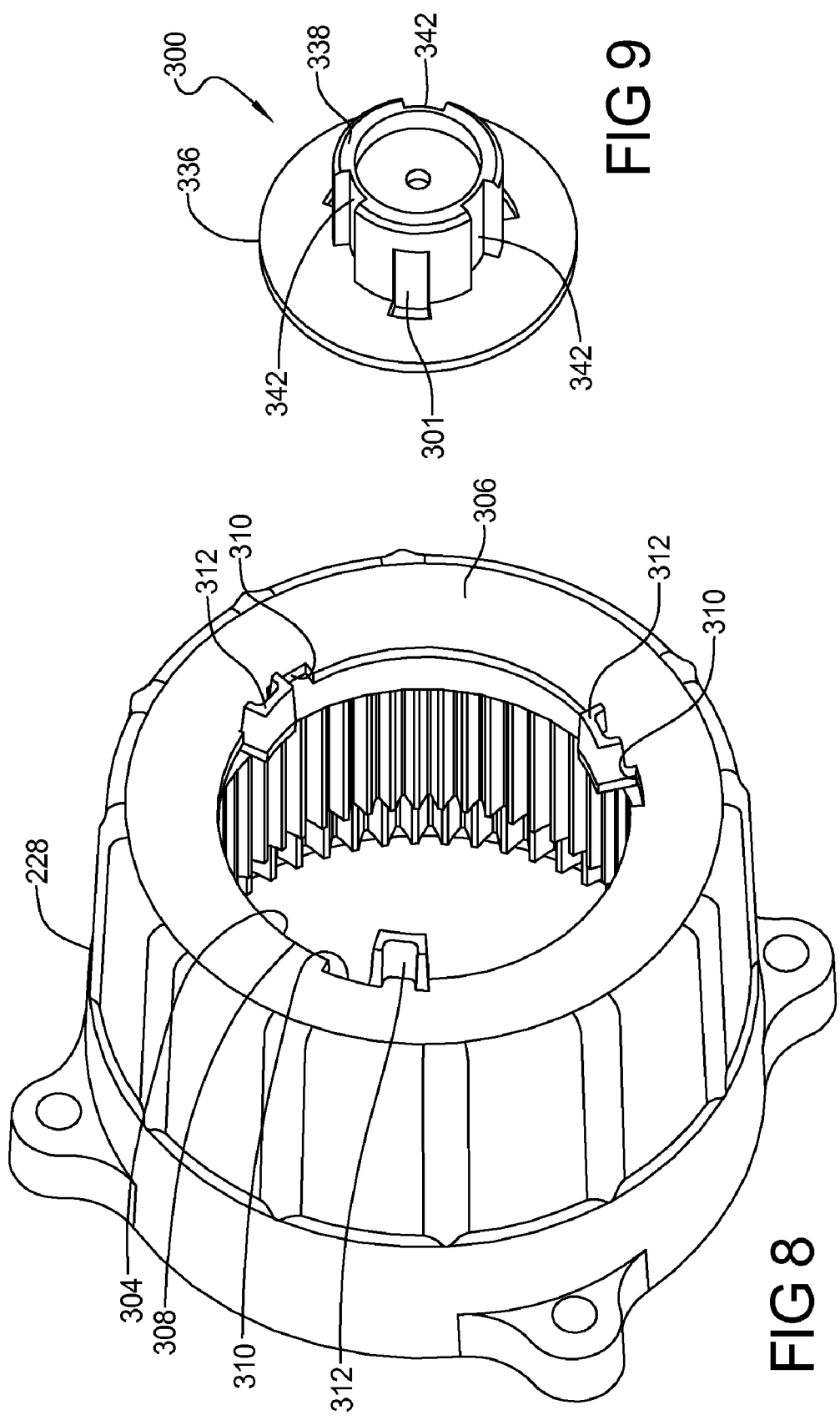

WINCH ASSEMBLY INCLUDING CLUTCH MECHANISM

CROSS-REFERENCE TO RELATED APPLICATIONS

This application claims the benefit of U.S. Provisional Application No. 60/866,525, filed on Nov. 20, 2006. The disclosure of the above application is incorporated herein by reference.

FIELD

The present disclosure relates to power devices, and more specifically to winch assemblies including clutch mechanisms.

BACKGROUND AND SUMMARY

The statements in this section merely provide background information related to the present disclosure and may not constitute prior art.

Winch assemblies may include a variety of parts to provide a freespool condition for the winch including various brake assemblies and clutch mechanisms. The existing brake assemblies and clutch mechanisms may include numerous parts that add cost to the assembly and provide for a complicated assembly process.

Accordingly, a winch assembly may include a housing member, a drum, a drive shaft, a gear train, a coupling member, and a clutch assembly. The drum may be rotatably coupled to the housing member and the drive shaft may extend through the drum and into the housing member. A first end of the shaft may be fixed for rotation with a drive input and axially displaceable relative to the drive input. The gear train may be located within the housing member and in a driven engagement with the drive shaft. The coupling member may be axially fixed to the drive shaft. The clutch assembly may include a clutch knob rotatably coupled to the housing member for rotation in first and second rotary directions. The clutch knob may include an axially extending ramped surface that axially displaces the drive shaft in a first axial direction when the clutch knob is rotated in the first rotary direction and rotationally couples the drum to the gear train through engagement with the coupling member. The ramped surface axially displaces the drive shaft in a second axial direction generally opposite the first axial direction when the clutch knob is rotated in the second rotary direction and disengages the drum from rotational engagement with the gear train.

An alternate winch assembly may include a housing member, a drum, a drive shaft, a gear train, a coupling member, and a clutch assembly. The drum may be rotatably coupled to the housing member and the drive shaft may extend through the drum and into the housing member. A first end of the shaft may be fixed for rotation with a drive input and axially displaceable relative to the drive input. The gear train may be located within the housing member and in a driven engagement with the drive shaft. The coupling member may be axially movable for engaging the drum with the gear train. The clutch assembly may include a clutch knob rotatably coupled to the housing member for rotation in first and second rotary directions. The clutch knob may include an axially extending ramped surface that axially displaces the coupling member in a first axial direction when the clutch knob is rotated in the first rotary direction and rotationally couples the drum to the gear train. The ramped surface may axially displace the coupling member in a second axial direction generally opposite the first axial direction when the clutch knob is rotated in the second rotary direction and may disengage the drum from rotational engagement with the gear train.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 8 is a perspective view of a gear housing member of the winch assembly of FIG. 5;

FIG. 9 is a perspective view of a thrust cap of the winch assembly of FIG. 5.

DETAILED DESCRIPTION

The following description is merely exemplary in nature and is not intended to limit the present disclosure, application, or uses.

Figure 1:
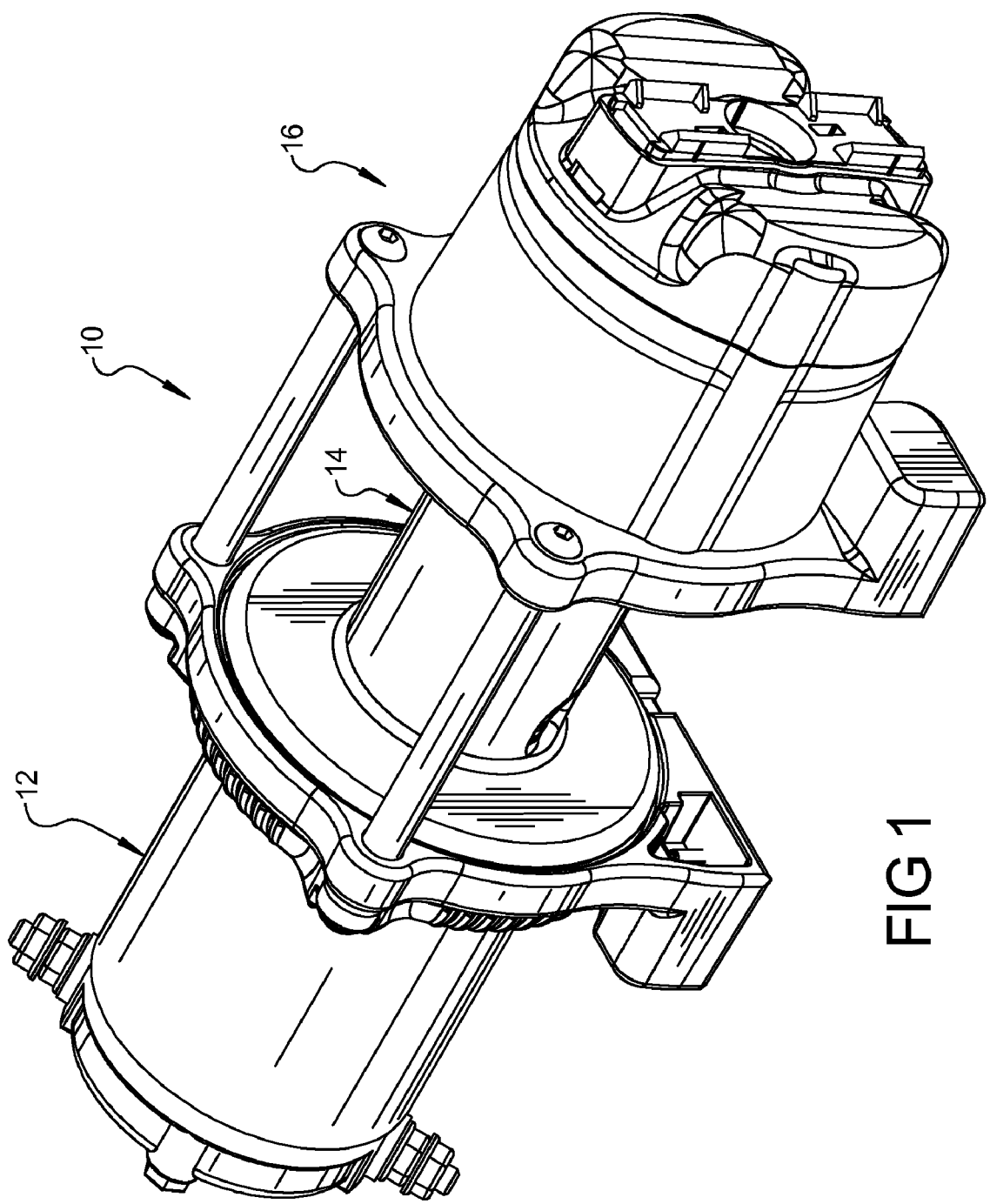
FIG. 1 is a perspective view of a winch assembly according to the present disclosure.

As seen in FIG. 1, a winch 10 may include a motor assembly 12, a drum 14, and a gear housing assembly 16. Drum 14 may be rotatably disposed between and driven by motor assembly 12 and gear housing assembly 16, as discussed below.

Figure 3:
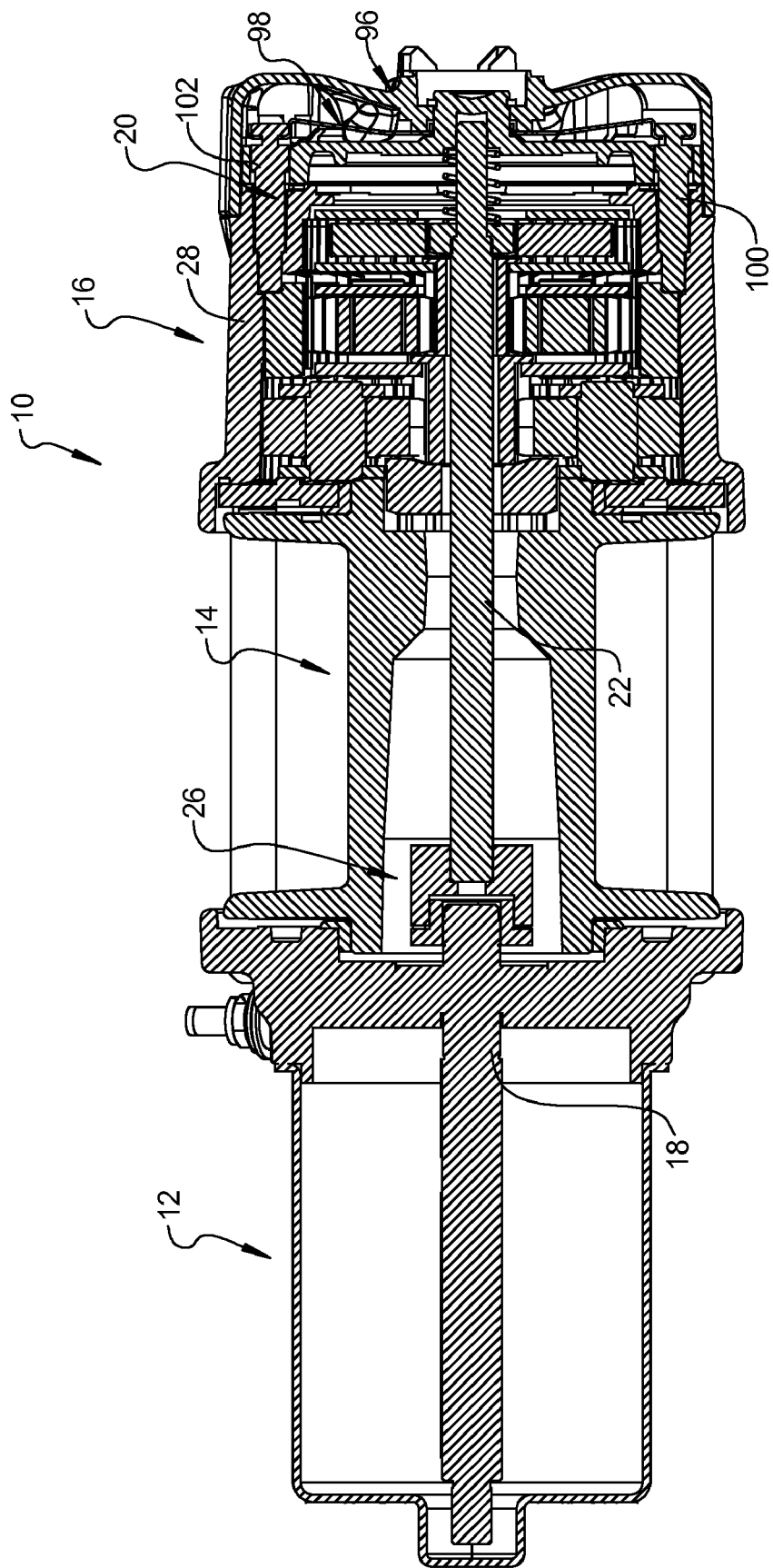
FIG. 3 is a sectional view of the winch assembly of FIG. 1.

With additional reference to FIG. 3, motor assembly 12 may be a reversible electric motor having an output shaft 18. Gear housing assembly 16 may be longitudinally offset from motor assembly 12 and may house a gear train 20 therein. Drum 14 may be disposed between and bearingly supported at opposite ends by motor assembly 12 and gear housing assembly 16. A drive shaft 22 may extend through drum 14 and may be coupled to output shaft 18 of motor assembly 12 at a first end. The coupling between output shaft 18 and the first end of the drive shaft 22 may include a cam mechanism 26. A second end of drive shaft 22 may be engaged with gear train 20, as discussed below.

Figure 2:
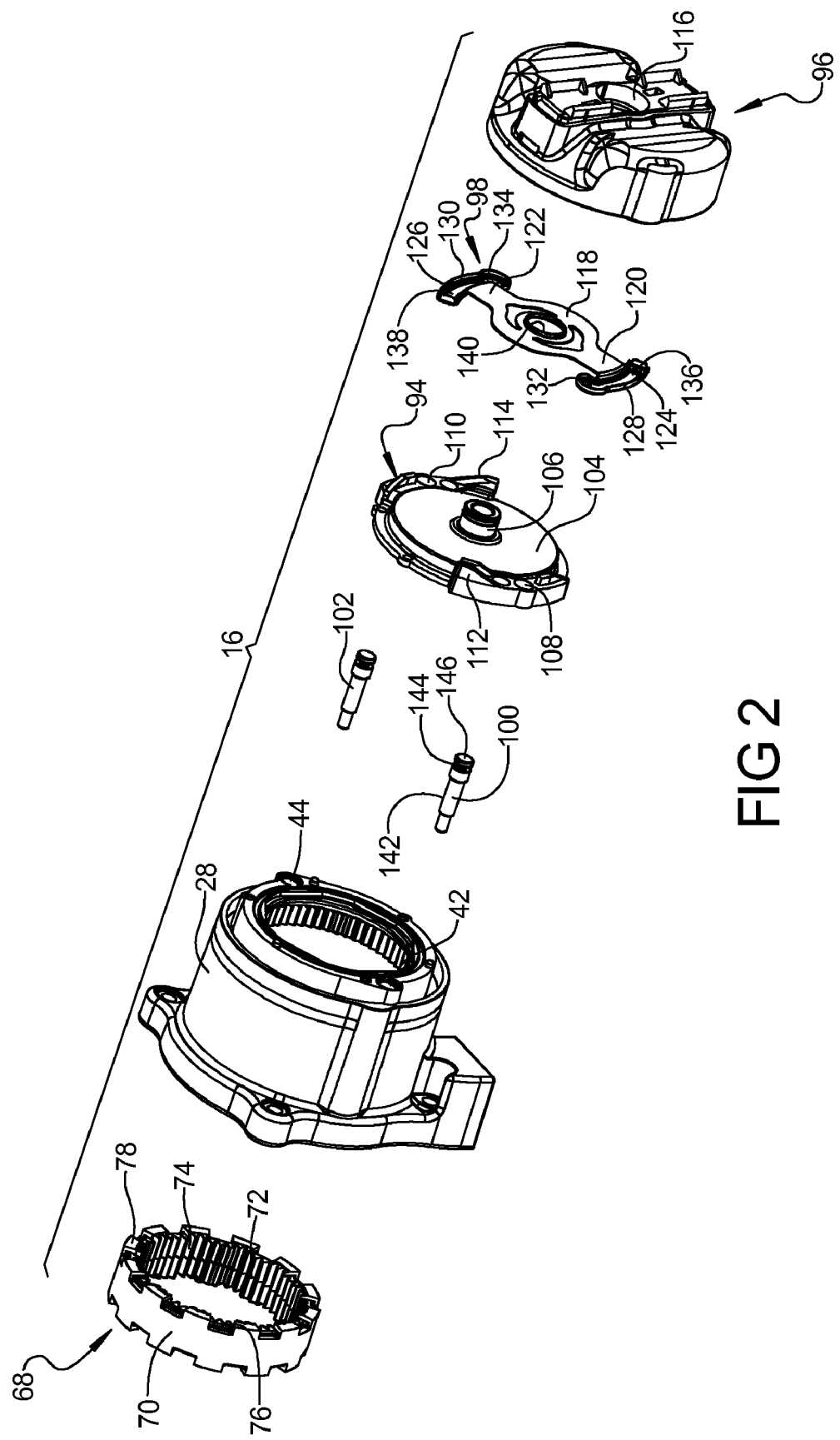
FIG. 2 is an exploded perspective view of a gear housing assembly shown in FIG. 1.
Figure 4:
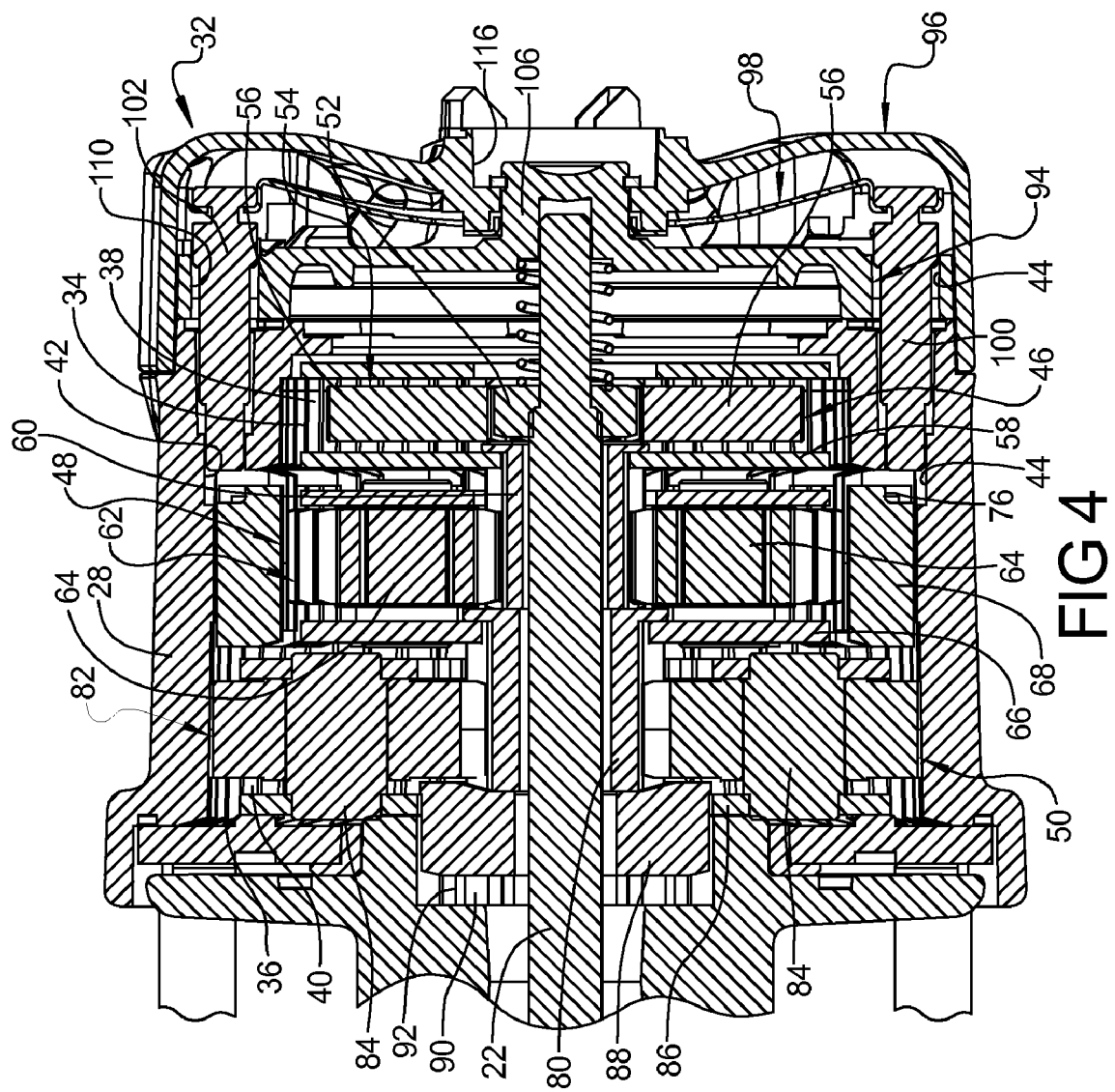
FIG. 4 is a fragmentary sectional view of the winch assembly of FIG. 1.

With additional reference to FIGS. 2 and 4, gear housing assembly 16 may include a housing member 28 generally fixed against rotation, gear train 20, and a clutch assembly 32. Housing member 28 may include first and second inner surfaces 34, 36 having gear teeth formed thereon axially offset from one another, forming first and second fixed ring gears 38, 40. A series of apertures 42, 44 may extend axially into housing member 28 past first fixed ring gear 38 and opening into an intermediate region between first and second fixed ring gears 38, 40.

With particular reference to FIGS. 3 and 4, gear train 20 may include first, second, and third stage planetary gear drive assemblies 46, 48, 50. First stage planetary gear drive assembly 46 may include a sun gear 52 non-rotatably fixed to drive shaft 22 and a planetary gear assembly 54 having three pinion gears 56 rotatably mounted to a carrier plate 58 and meshingly engaged with sun gear 52 and first fixed ring gear 38.

Second stage planetary gear drive assembly 48 may include a sun gear 60 rotatably mounted on drive shaft 22, which passes through sun gear 60, a planetary gear assembly 62 having three pinion gears 64 rotatably mounted to a carrier plate 66, and a ring gear 68. Ring gear 68 may be located between first and second fixed ring gears 38, 40 and may be rotatably mounted to housing member 28. As best shown in FIG. 2, ring gear 68 may include a cylindrical body having a generally smooth outer surface 70 and an inner surface 72 having gear teeth 74 extending therefrom. Ring gear 68 may also include a series of recesses 76 extending axially into an end surface 78 thereof for selective engagement with clutch assembly 32, discussed below. Pinion gears 64 may be meshingly engaged with gear teeth 74 and meshingly engaged with sun gear 60. Sun gear 60 may be fixed for rotation with carrier plate 58.

Third stage planetary gear drive assembly 50 may include a sun gear 80 rotatably mounted on drive shaft 22, which passes through sun gear 80, and a planetary gear assembly 82 having three pinion gears 84 rotatably mounted to a carrier plate 86 and meshingly engaged with sun gear 80 and second fixed ring gear 40. Sun gear 80 may be fixed for rotation with carrier plate 66 of second stage planetary gear drive assembly 48.

A coupling 88 may be rotatably mounted to drive shaft 22, which passes through coupling 88, to carrier plate 86 of third stage planetary gear drive assembly 50 for rotation therewith. Coupling 88 may be drivingly engaged with drum 14. More specifically, drum 14 may include an inner surface 90 having splines 92 extending therefrom and meshingly engaged with coupling 88.

With reference to FIGS. 2-4, clutch assembly 32 may include a clutch cap 94, a clutch dial 96, a clutch bar 98, and first and second clutch pins 100, 102. Clutch cap 94 may be non-rotatably fixed to an end of housing member 28. With particular reference to FIG. 2, clutch cap 94 may include a generally planar body 104 having a central hub portion 106 extending axially outwardly therefrom. Clutch cap body 104 may include first and second apertures 108, 110 and first and second ramped portions 112, 114. First and second apertures 108, 110 may extend through a circumferential portion of clutch cap body 104 and may be aligned with apertures 42, 44 in housing member 28. First and second ramped portions 112, 114 may be located adjacent first and second apertures 108, 110, although other locations could be utilized.

Clutch dial 96 may be rotatably mounted to housing member 28 and may include a central aperture 116 located on central hub portion 106 of clutch cap 94 and rotatable thereabout. Clutch bar 98 may be fixed for rotation with clutch dial 96. Clutch bar 98 may include a central body portion 118 having arms 120, 122 extending radially outwardly therefrom. Arms 120, 122 may each include radially outer arcuate portions 124, 126 having circumferentially extending channels 128, 130 generally aligned with clutch cap apertures 108, 110 and housing member apertures 42, 44. Channels 128, 130 may each include a first portion 132, 134 having a generally circular opening and a second portion 136, 138 forming the remainder of the channels 128, 130. Second portions 136, 138 may have a width that is less than the diameter of first portions 132, 134 for retention of clutch pins 100, 102 therein, as discussed below. Central body portion 118 may include a centrally disposed aperture 140 disposed around clutch cap hub portion 106 for rotation thereabout with clutch dial 96.

Clutch pins 100, 102 may be generally similar to one another, therefore only clutch pin 100 will be described in detail with the understanding that the description applies equally to clutch pin 102. Clutch pin 100 includes an elongate body portion 142, a neck 144, and a head 146. Neck 144 may have a diameter that is less than a diameter of both body portion 142 and head 146. Body portion 142 and head 146 may have diameters that are less than the diameter of first portion 132 of clutch bar channel 128 but greater than the width of second portion 136 of clutch bar channel 128. The relationship between the diameters of clutch pin 100 and clutch bar channel 128 may allow clutch bar 98 to be installed after clutch pin 100 is already assembled in clutch cap 94 and housing member 28. More specifically, clutch bar channel first portion 132 may be placed over head 146 to neck 144 and rotated such that clutch pin 100 is axially engaged with clutch bar channel second portion 136 through the relationship between the diameters thereof.

Clutch pins 100, 102 may be displaced between an engaged position with ring gear 68 (seen in FIG. 3) and a disengaged position (seen in FIG. 4). Clutch pins 100, 102 may be normally biased into the engaged position by clutch bar 98. Clutch bar 98 may act as a leaf spring, urging clutch pins 100, 102 into recesses 76 of ring gear 68, rotationally fixing ring gear 68 relative to housing member 28. Since housing member 28 is rotationally fixed, ring gear 68 is therefore also rotationally fixed when clutch pins 100, 102 are in the engaged position.

Rotation of clutch dial 96 may move clutch pins 100, 102 into the disengaged position shown in FIG. 4. More specifically, rotation of clutch dial 96 causes rotation of clutch bar 98 therewith. As clutch bar 98 is rotated, arcuate portions 124, 126 travel along ramped portions 112, 114 of clutch cap 94. As clutch bar arcuate portions 124, 126 travel along ramped portions 112, 114, they are translated axially outwardly relative to housing member 28. As clutch bar arcuate portions 124, 126 are axially translated, clutch pins 100, 102 may be axially translated as well due to the engagement between clutch pins 100, 102 and clutch bar channels 128, 130 discussed above. When axially translated, clutch pins 100, 102 are removed from recesses 76 in ring gear 68, allowing ring gear to rotate freely relative to housing member 28.

Operation of winch 10 will now generally be discussed. Operation will be discussed without reference to a rotational direction with the understanding that motor assembly 12 may rotate drive shaft 22 in first and second directions. The description of the operation of winch 10 is merely intended to illustrate the function of clutch assembly 32.

As drive shaft 22 is rotated by motor assembly 12, sun gear 52 is caused to rotate therewith. Rotation of sun gear 52 may be translated to pinion gears 56 of first stage planetary gear drive assembly 46. Rotation of pinion gears 56 may cause rotation of carrier plate 58 relative to housing member 28 due to the meshed engagement between pinion gears 56 and first fixed ring gear 38. Rotation of carrier plate 58 may cause rotation of sun gear 60 of second stage planetary gear drive assembly 48.

Rotation of sun gear 60 may cause a corresponding rotation of pinion gears 64. Rotation of pinion gears 64 may or may not cause rotation of carrier plate 66, depending on whether clutch pins 100, 102 are in an engaged or a disengaged position. If clutch pins 100, 102 are in a disengaged position, seen in FIG. 4, ring gear 68 may rotate relative to housing member 28, causing a freespool condition where second stage planetary gear drive assembly 48 is disengaged. More specifically, pinion gears 64 may engage gear teeth 74 of ring gear 68, causing ring gear 68 to rotate relative to housing member 28. As a result, when in this disengaged position, drive torque is not transmitted to third stage planetary gear drive assembly 50, and therefore drum 14 is not driven.

If clutch pins 100, 102 are in an engaged position, seen in FIG. 3, ring gear 68 may be rotationally fixed relative to housing member 28. When ring gear 68 is rotationally fixed relative to housing member 28, rotation of pinion gears 64 by sun gear 60 may cause pinion gears 64 to travel along inner surface 72 of ring gear 68, resulting in carrier plate 66 rotating relative to housing member 28. Rotation of carrier plate 66 may cause rotation of sun gear 80 of third stage planetary gear drive assembly 50.

Rotation of sun gear 80 may cause a corresponding rotation of pinion gears 84. Rotation of pinion gears 84 may cause rotation of carrier plate 86 relative to housing member 28 due to the meshed engagement between pinion gears 84 and second fixed ring gear 40. Rotation of carrier plate 86 may cause rotation of coupling 88 due to a fixed connection therebetween. Rotation of coupling 88 may be translated to drum 14 due to the meshed engagement between drum spline teeth 92 and coupling 88. When in the freespool condition discussed above, drum 14 may rotate freely in a direction opposite the direction of rotation when engaged with coupling 88.

As seen in FIGS. 5-10, an alternate winch 210 may include a motor assembly 212, a drum 214, and a gear housing assembly 216. Drum 214 may be rotatably disposed between and driven by motor assembly 212 and gear housing assembly 216, as discussed below.

Figure 5:
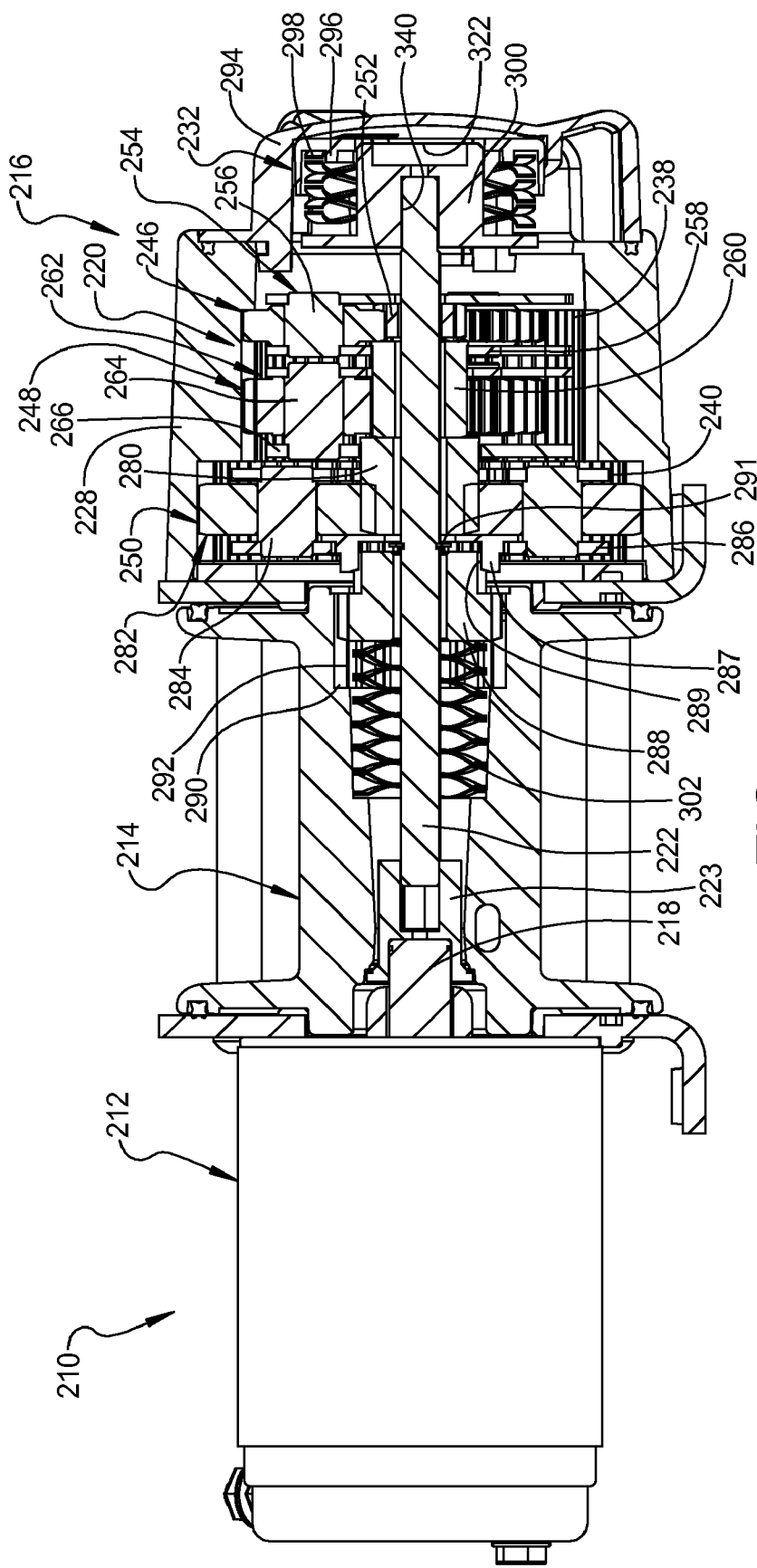
FIG. 5 is a sectional view of an alternate winch assembly according to the present disclosure.
Figure 6:
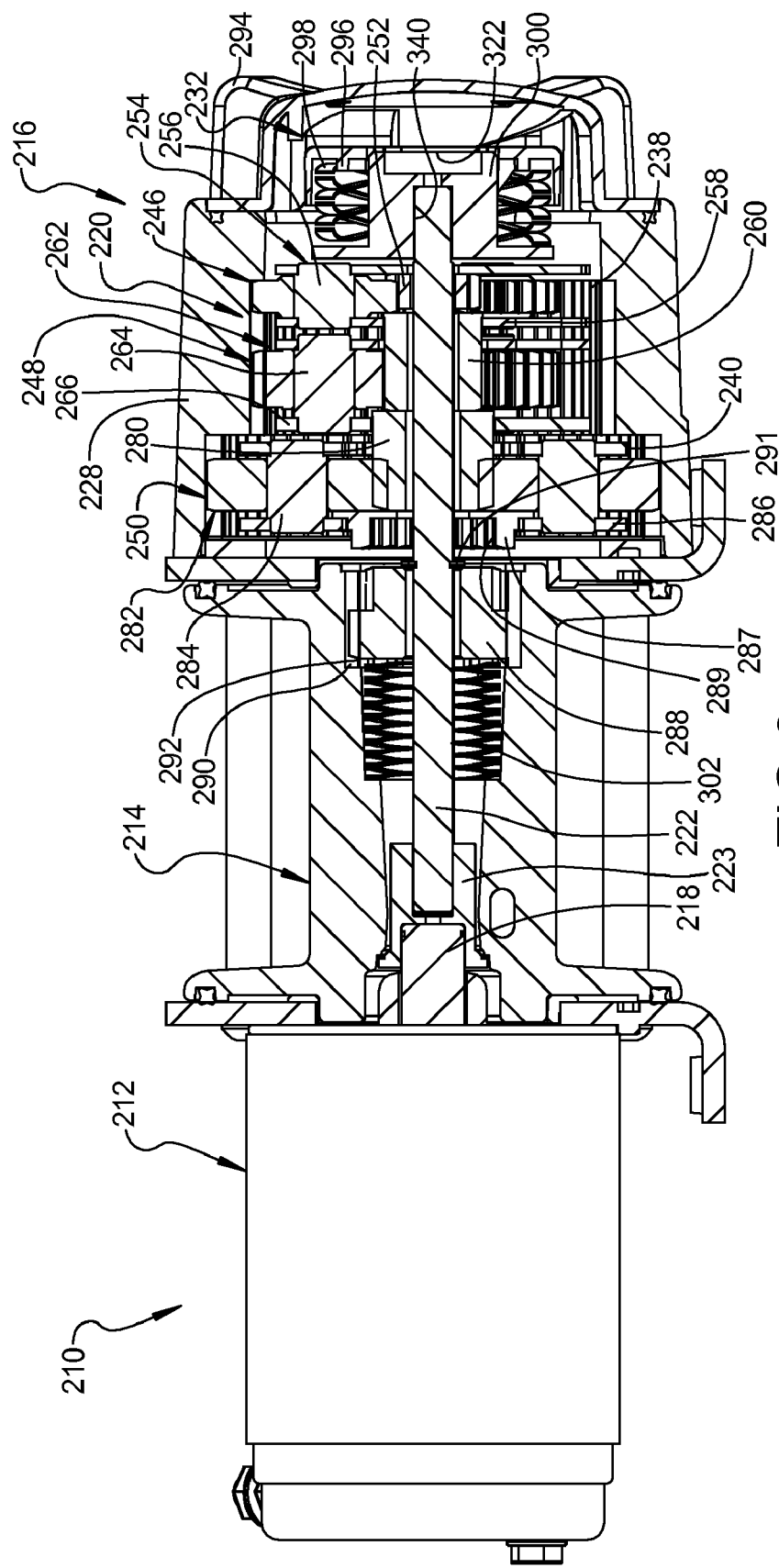
FIG. 6 is an additional sectional view of the winch assembly of FIG. 5.

With reference to FIGS. 5 and 6, motor assembly 212 may be a reversible electric motor having an output shaft 218. Gear housing assembly 216 may be longitudinally offset from motor assembly 212 and may house a gear train 220 therein. Drum 214 may be disposed between and bearingly supported at opposite ends by motor assembly 212 and gear housing 216. A drive shaft 222 may extend through drum 214 and may be coupled to output shaft 218 of motor assembly 212 at a first end. A drive input member 223 can be attached to output shaft 218 and can allow axial movement of shaft 222 while maintaining a driving connection therewith. A second end of drive shaft 222 may be engaged with gear train 220, as discussed below.

Gear housing assembly 216 may include a housing member 228, generally fixed against rotation, gear train 220, and a clutch assembly 232. Housing member 228 may include first and second inner surfaces 234, 236 having gear teeth formed thereon axially offset from one another, forming first and second ring gears 238, 240.

With particular reference to FIGS. 5 and 6, gear train 220 may include first, second, and third stage planetary gear drive assemblies 246, 248, 250. First planetary gear drive assembly 246 may include a sun gear 252 non-rotatably fixed to drive shaft 222 and slidable thereon and a planetary gear assembly 254 having three pinion gears 256 rotatably mounted to a carrier plate 258 and meshingly engaged with sun gear 252 and first ring gear 238.

Second stage planetary gear drive assembly 248 may include a sun gear 260 rotatably mounted on drive shaft 222, a planetary gear assembly 262 having three pinion gears 264 rotatably mounted to a carrier plate 266 and meshingly engaged with sun gear 260 and first ring gear 238. Sun gear 260 may be fixed for rotation with carrier plate 258.

Third stage planetary gear drive assembly 250 may include a sun gear 280 rotatably mounted on drive shaft 222 and a planetary gear assembly 282 having three pinion gears 284 rotatably mounted to a carrier plate 286 and meshingly engaged with sun gear 280 and second fixed ring gear 240. Sun gear 280 may be fixed for rotation with carrier plate 266. Carrier plate 286 may have a coupling member 287 fixed thereto having radially inwardly extending splines 289.

A clutch coupler 288 may be rotatably mounted to drive shaft 222. Clutch coupler 288 may abut an axially fixed stop member 291 on shaft 222. Clutch coupler 288 may be drivingly engaged with drum 214. More specifically, drum 214 may include an inner surface 290 having spline teeth 292 extending therefrom and meshingly engaged with clutch coupler 288. Clutch coupler 288 may provide selective engagement between drum 214 and gear train 220, as discussed below.

Figure 7:
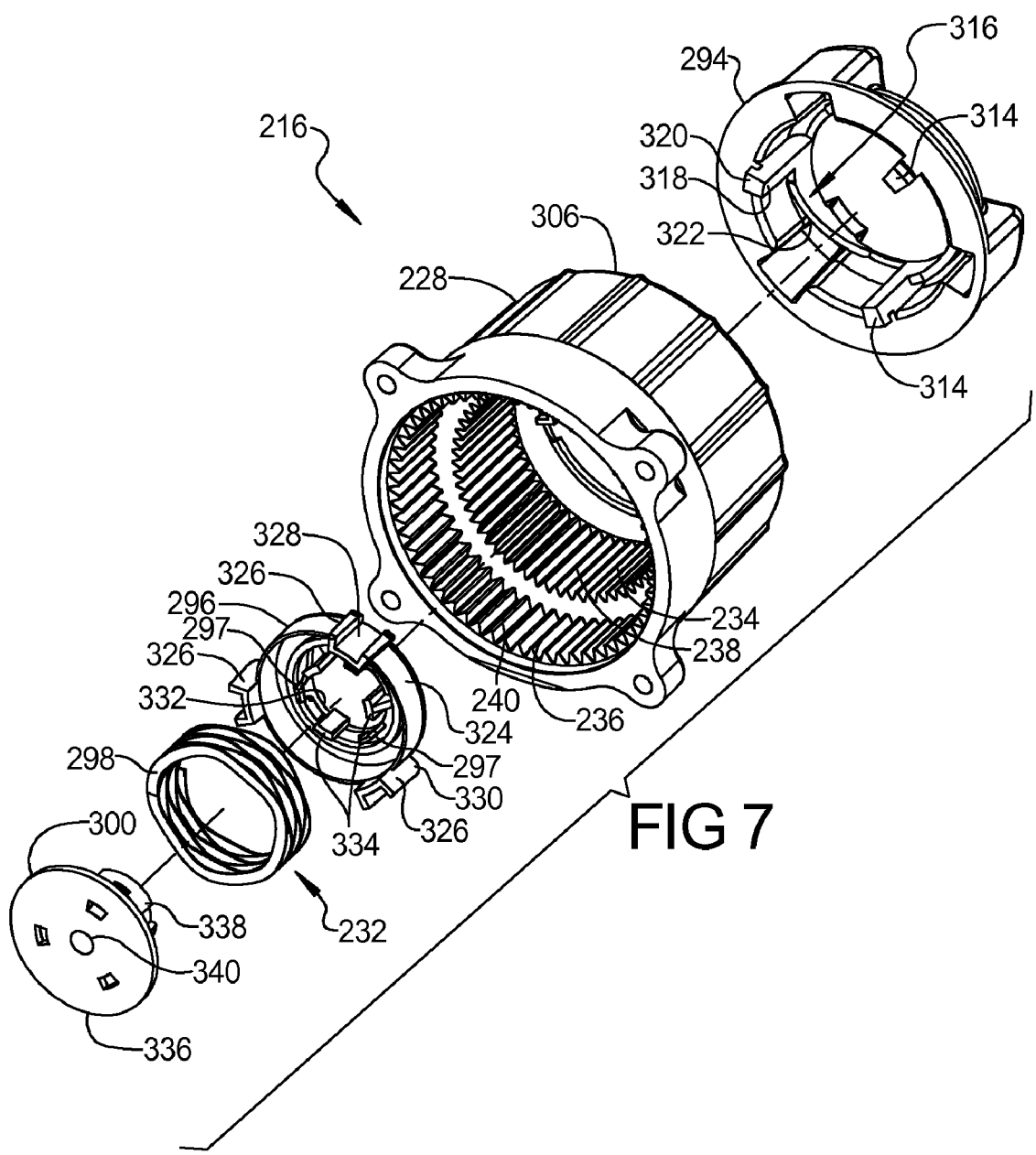
FIG. 7 is an exploded perspective view of a gear housing assembly shown in FIG. 5.
Figure 10:
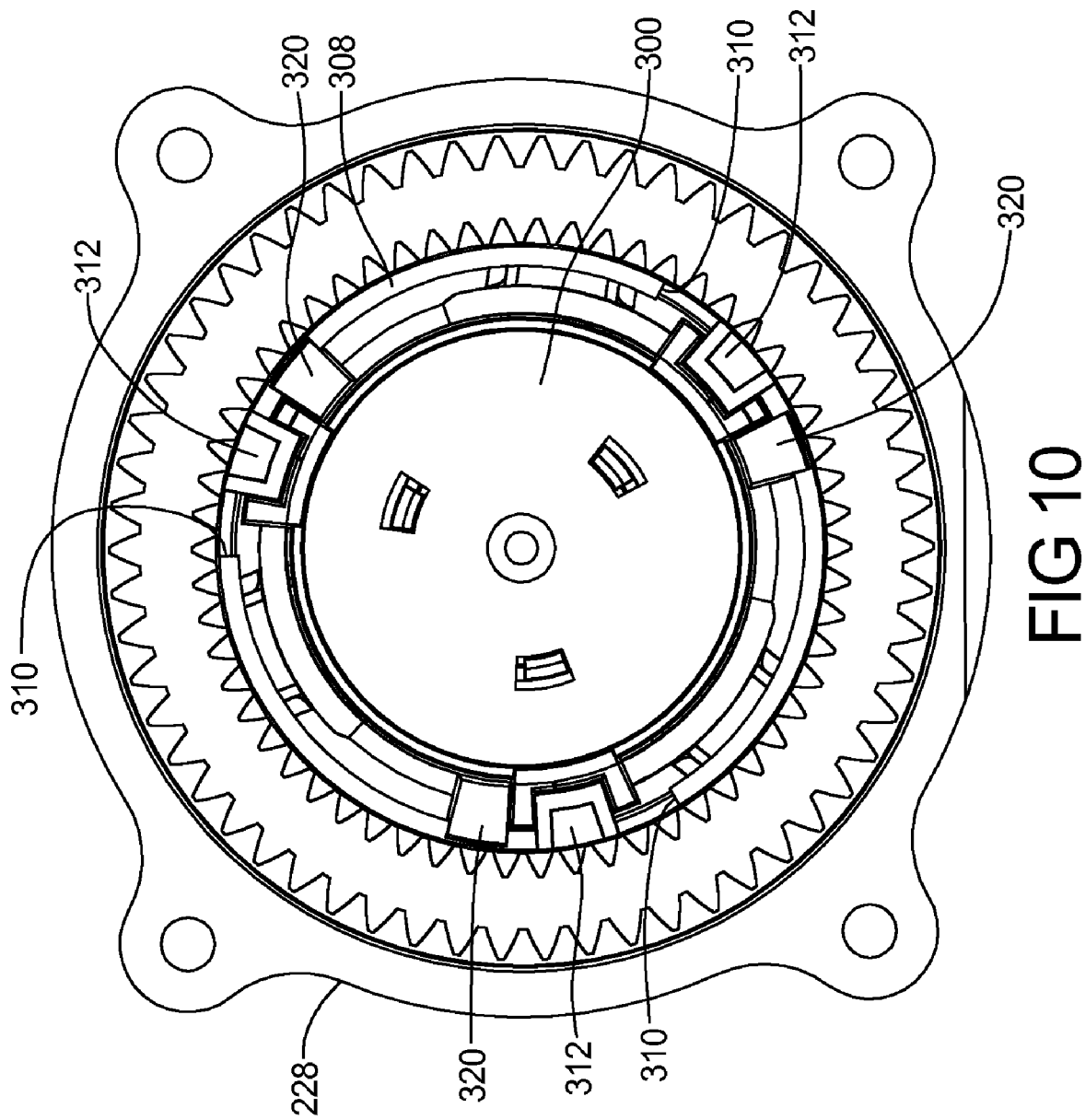
FIG. 10 is an end plan view of the gear assembly housing of FIG. 5.

With additional reference to FIG. 7, clutch assembly 232 may include a clutch knob 294, a cam follower 296, a disengagement spring 298, a thrust cap 300, and an engagement spring 302. Clutch knob 294, cam follower 296, disengagement spring 298, and thrust cap 300 may be contained within housing member 228 without the use of fasteners, as will be described herein. With particular reference to FIGS. 8 and 10, housing member 228 may include an opening 304 at an end 306 thereof. End 306 may include a lip 308 extending radially inwardly around a circumference of opening 304. Lip 308 may include a series of recesses 310 therein. End 306 may further include a series of protrusions 312 extending radially inwardly from opening 304 and beyond lip 308. Protrusions 312 may be located adjacent recesses 310.

Clutch knob 294 may include a series of axially inwardly extending protrusions 314 and a series of cam features 316 disposed about an inner circumference thereof. Protrusions 314 may include first and second portions 318, 320. First portion 318 may be located axially inward of second portion 320 and may have a lesser radial extent than second portion 320. Cam features 316 may include a series of ramped surfaces 322.

Cam follower 296 may be disposed within clutch knob 294 and may include a main body portion 324 and a series of arms 326 extending radially outwardly therefrom. Main body portion 324 may be located radially within cam features 316 and arms 326 may extend radially outwardly relative to cam features 316. Arms 326 may include a recess 328 housing protrusions 312 therein, slidably coupling cam follower 296 to housing 228. An axially outer end 330 of arm 326 may abut ramped surface 322, as discussed below. Main body portion 324 may include an aperture 332 therethrough. A series of guide members 334 may extend radially inwardly relative aperture 332.

During assembly, protrusions 314 may be inserted into recesses 310 in housing 228. More specifically, second portions 320 of protrusions 314 may be inserted axially beyond lip 308. Clutch knob 294 may then be rotated relative to housing 228, axially retaining and rotatably coupling clutch knob 294 relative to housing 228. Clutch knob 294 may be locked into engagement with housing 228 by cam follower 296. More specifically, once arms 326 are engaged with protrusions 312, recesses 310 may be obstructed such that clutch knob 294 may not be removed from housing 228.

With particular reference to FIG. 9, thrust cap 300 may include first and second portions 336, 338. First portion 336 may be disc-shaped having second portion 338 extending therefrom. Disengagement spring 298 may be disposed between cam follower 296 and first portion 336 of thrust cap 300 (seen in FIGS. 5 and 6). Cam follower 296 may include recesses 297 for engagement with snap features 301 of thrust cap 300. Engagement between snap features 301 and recesses 297 couples thrust cap 300 to cam follower 296, allowing a range of axial displacement therebetween and capturing disengagement spring 298 therebetween. More specifically, spring 298 may be placed over second portion 338 before coupling thrust cap 300 to cam follower 296. Second portion 338 may have an outer diameter less than an outer diameter first portion 336 and may form a seat for disengagement spring 298. An aperture 340 may extend through first portion 336 and partially into second portion 338. As seen in FIGS. 5 and 6, shaft 222 may extend into aperture 340. An outer surface of second portion 338 may include axially extending recesses 342 therein. Recesses 342 may receive guide member 334 therein.

Operation of winch 210 will now generally be discussed. Operation will be discussed without reference to a rotational direction with the understanding that motor assembly 212 may rotate drive shaft 222 in first and second directions. The description of the operation of winch 210 is merely intended to illustrate the function of clutch assembly 232.

As drive shaft 222 is rotated by motor assembly 212, sun gear 252 is caused to rotate therewith. Rotation of sun gear 252 may drive rotation of planetary gear assembly 254. Planetary gear assembly 254 may drive rotation of second planetary gear drive assembly 248 which may drive rotation of third planetary gear drive assembly 250. Rotation of third planetary gear drive assembly 250 may include rotation of carrier plate 286 and therefore coupling member 287. Drum 214 may be selectively driven by rotation of coupling member 287 when engaged with clutch coupler 288, as discussed below.

More specifically, clutch coupler 288 may provide selective engagement with coupling member splines 289 when in an engaged position. As seen in FIG. 5, engagement spring 302 abuts drum 214 and provides an axial force against clutch coupler 288, biasing clutch coupler 288, and therefore drive shaft 222, axially outwardly from drum 214 and into engagement with coupling member 287. When in the engaged position, clutch coupler 288 is engaged with both drum 214 and coupling member 287, resulting in rotation of carrier plate 286 being translated to drum 214.

Engagement spring 302 may have a biasing force significantly greater than the force applied by disengagement spring 298, resulting in an engagement of drum 214 during normal operation. When disengagement of drum 214 is desired, clutch knob 294 may be rotated. Rotation of clutch knob 294 may cause arms 326 of cam follower 296 to ride along ramped surface 322, resulting in axial displacement of cam follower 296 (seen in FIG. 6) and compression of disengagement spring 298.

Compression of disengagement spring 298 may result in an increased spring force applied against thrust cap 300 and therefore shaft 222. More specifically, the increased spring force of disengagement spring 298 may be greater than the spring force applied by engagement spring 302, resulting in axial displacement of shaft 222 relative to drive input member 223. Clutch coupler 288 may therefore be displaced axially as well, due to the engagement between clutch coupler 288 and stop member 291, resulting in the disengagement of clutch coupler 288 from coupling member 287. As such, drum 214 may be disengaged from gear train 220.

What is claimed is:

1. A winch assembly comprising:
   a housing member;
   a drum rotatably coupled to said housing member;
   a drive shaft extending through said drum and into said housing member, a first end of said shaft fixed for rotation with a drive input and axially displaceable relative to said drive input;
   a gear train located within said housing member and in a driven engagement with said drive shaft;
   a coupling member axially fixed to said drive shaft; and
   a clutch assembly including a clutch knob rotatably coupled to said housing member for rotation in first and second rotary directions, said clutch knob including an axially extending ramped surface that axially displaces said drive shaft in a first axial direction when said clutch knob is rotated in said first rotary direction and rotationally couples said drum to said gear train through engagement with said coupling member, said ramped surface axially displacing said drive shaft in a second axial direction generally opposite said first axial direction when said clutch knob is rotated in said second rotary direction and disengages said drum from rotational engagement with said gear train.

2. The winch assembly of claim 1, further comprising a biasing member having a first end axially fixed relative to said drum and a second end engaged with said coupling member.

3. The winch assembly of claim 2, wherein said biasing member urges said coupling member into engagement with said gear train.

4. The winch assembly of claim 3, wherein said coupling member is fixed for rotation with said drum when said clutch knob is rotated in said first rotary direction and when said clutch knob is rotated in said second rotary direction.

5. The winch assembly of claim 2, wherein said biasing member urges said drive shaft in said first axial direction, said first axial direction being axially outwardly from said drive input.

6. The winch assembly of claim 1, wherein said clutch assembly includes a thrust member engaged with a second end of said drive shaft generally opposite said first end, said thrust member receiving an axial biasing force from said ramped surface and transferring said biasing force to said drive shaft.

7. The winch assembly of claim 6, wherein said clutch assembly includes a first biasing member disposed axially between said thrust member and said clutch knob, said first biasing member urging said drive shaft in said second axial direction.

8. The winch assembly of claim 7, wherein said clutch assembly includes a cam follower slidably engaged with said housing member for axial displacement relative thereto.

9. The winch assembly of claim 8, wherein said cam follower is located axially between said ramped surface and said first biasing member, said cam follower being displaced axially toward said drive input when said clutch knob is rotated in said first rotary direction.

10. The winch assembly of claim 9, wherein said first biasing member is axially compressed to a first installed length between said thrust member and said cam follower when said clutch knob is rotated in said first rotary direction, said first biasing member extending to a second installed length when said clutch knob is rotated in said second rotary direction.

11. The winch assembly of claim 10, further comprising a second biasing member engaged with said coupling member and applying a first force to said drive shaft in said first axial direction, said first biasing member applying a second force to said drive shaft in said second axial direction.

12. The winch assembly of claim 11, wherein said second force is greater than said first force when said first biasing member is at said first installed length.

13. The winch assembly of claim 11, wherein said second force is less than said first force when said first biasing member is at said second installed length.

14. The winch assembly of claim 1, wherein said drum is in a freespool condition after said clutch knob is rotated in said second rotary direction.

15. The winch assembly of claim 1, wherein said housing includes an opening at an axial end thereof generally opposite said drum, said opening including recesses extending radially outwardly from said opening, said clutch knob including protrusions corresponding to said recesses for installation of said clutch knob during assembly.

16. The winch assembly of claim 15, wherein said wherein said clutch assembly includes a cam follower having arms extending into said recesses, slidably coupling said cam follower to said housing member and preventing removal of said clutch knob from said housing assembly.

17. The winch assembly of claim 16, wherein said cam follower is engaged with said ramped surface of said clutch knob to provide displacement of said drive shaft based on rotation of said clutch knob.

18. The winch assembly of claim 17, wherein said clutch assembly includes a biasing member urging said cam follower into engagement with said ramped surface.

19. The winch assembly of claim 18, wherein said biasing member urges said drive shaft in said second axial direction.

20. The winch assembly of claim 1, wherein said gear train includes a sun gear fixed for rotation with said drive shaft and axially displaceable relative thereto when said drive shaft is displaced between said first and second axial directions.

21. A winch assembly comprising:
a housing member;
a drum rotatably coupled to said housing member;
a drive shaft extending through said drum and into said housing member, a first end of said shaft fixed for rotation with a drive input and axially displaceable relative to said drive input;
a gear train located within said housing member and in a driven engagement with said drive shaft;
a coupling member axially movable for engaging said drum with said gear train; and
a clutch assembly including a clutch knob rotatably coupled to said housing member for rotation in first and second rotary directions, said clutch knob including an axially extending ramped surface that axially displaces said coupling member in a first axial direction when said clutch knob is rotated in said first rotary direction and rotationally couples said drum to said gear train, said ramped surface axially displacing said coupling member in a second axial direction generally opposite said first axial direction when said clutch knob is rotated in said second rotary direction and disengages said drum from rotational engagement with said gear train.

22. The winch assembly of claim 21, further comprising a biasing member having a first end axially fixed relative to said drum and a second end engaged with said coupling member.

23. The winch assembly of claim 22, wherein said biasing member urges said coupling member into engagement with said gear train.

* * * * *

UNITED STATES PATENT AND TRADEMARK OFFICE
CERTIFICATE OF CORRECTION

PATENT NO. : 7,588,233 B2  
APPLICATION NO. : 11/943043  
DATED : September 15, 2009  
INVENTOR(S) : Roe et al.

Page 1 of 1

It is certified that error appears in the above-identified patent and that said Letters Patent is hereby corrected as shown below:

Col. 9; line 10 and 11;  
In claim 16, line 1, the second occurrence of "wherein said" should be deleted.

Signed and Sealed this

Fifteenth Day of December, 2009

David J. Kappos  
*Director of the United States Patent and Trademark Office*